(12) United States Patent
Howson (10) Patent No.: US 10,559,120 B2
(45) Date of Patent: *Feb. 11, 2020

(54) PROCESSING PRIMITIVES WHICH HAVE UNRESOLVED FRAGMENTS IN A GRAPHICS PROCESSING SYSTEM

(71) Applicant: Imagination Technologies Limited, Kings Langley (GB)

(72) Inventor: John Howson, St Albans (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/726,992

(22) Filed: Oct. 6, 2017

(65) Prior Publication Data

US 2018/0033187 A1   Feb. 1, 2018

Related U.S. Application Data

(63) Continuation of application No. 15/007,406, filed on Jan. 27, 2016, now Pat. No. 9,799,137.

(30) Foreign Application Priority Data

Jan. 27, 2015 (GB) .................... 1501293.3

(51) Int. Cl.
| | | |
|---|---|---|
| *G06T 15/40* | (2011.01) | |
| *G06T 19/20* | (2011.01) | |
| *G06T 15/30* | (2011.01) | |
| *G06T 15/00* | (2011.01) | |

(52) U.S. Cl.
CPC .......... *G06T 15/405* (2013.01); *G06T 15/005* (2013.01); *G06T 15/30* (2013.01); *G06T 15/40* (2013.01); *G06T 19/20* (2013.01)

(58) Field of Classification Search
CPC ....... G06T 15/30; G06T 15/40; G06T 15/005; G06T 15/405; G06T 19/20
(Continued)

(56) References Cited

U.S. PATENT DOCUMENTS 5,864,342 A * 1/1999 Kajiya ................. G06T 11/001
   345/418
5,977,977 A * 11/1999 Kajiya ................. G06T 11/001
   345/418
(Continued)

FOREIGN PATENT DOCUMENTS

GB   2404316 A   1/2005

OTHER PUBLICATIONS

Imagination Technologies Ltd: "PowerVR Series 5 SGX Architecture Guide for Developers," Nov. 1, 2011 (Nov. 1, 2011), pp. 1-27.

*Primary Examiner* — King Y Poon
*Assistant Examiner* — Vincent Peren
(74) *Attorney, Agent, or Firm* — Potomac Law Group PLLC; Vincent M DeLuca (57) ABSTRACT

A graphics processing system performs hidden surface removal and texturing/shading on fragments of primitives. The system includes a primary depth buffer (PDB) for storing depth values of resolved fragments, and a secondary depth buffer (SDB) for storing depth values of unresolved fragments. Incoming fragments are depth tested against depth values from either the PDB or the SDB. When a fragment passes a depth test, its depth value is stored in the PDB if it is a resolved fragment (e.g. if it is opaque or translucent), and its depth value is stored in the SDB if it is an unresolved fragment (e.g. if it is a punch through fragment). This provides more opportunities for subsequent opaque objects to overwrite punch through fragments which passed a depth test, thereby reducing unnecessary process- (Continued)

ing and time which may be spent on fragments which ultimately will not contribute to the final rendered image.

19 Claims, 6 Drawing Sheets

(58) Field of Classification Search
USPC .................................. 345/421, 422; 382/154
See application file for complete search history.

(56) References Cited

U.S. PATENT DOCUMENTS

| | | | |
|---|---|---|---|
| 6,104,407 A | 8/2000 | Aleksic et al. | |
| 6,697,063 B1 * | 2/2004 | Zhu | G06T 15/005 345/421 |
| 6,898,692 B1 * | 5/2005 | Cameron | G06T 15/405 710/52 |
| 7,170,515 B1 | 1/2007 | Zhu | |
| 7,256,796 B1 * | 8/2007 | Bastos | G06T 11/40 345/589 |
| 9,406,165 B2 | 8/2016 | Marvie et al. | |
| 2003/0002729 A1 | 1/2003 | Wittenbrink | |
| 2003/0080959 A1 * | 5/2003 | Morein | G06T 15/405 345/422 |
| 2005/0017970 A1 * | 1/2005 | Howson | G06T 15/40 345/421 |
| 2012/0069021 A1 | 3/2012 | Son et al. | |
| 2015/0097830 A1 * | 4/2015 | Jeong | G06T 15/005 345/421 |
| 2016/0379333 A1 | 12/2016 | Krutsch et al. | |

* cited by examiner

PROCESSING PRIMITIVES WHICH HAVE UNRESOLVED FRAGMENTS IN A GRAPHICS PROCESSING SYSTEM

BACKGROUND

Graphics processing systems are used to process graphics data in order to render images. As part of the processing performed by a graphics processing system, primitives of objects in a three-dimensional scene are processed to determine which of the primitives are visible at each sample position of a rendering space of the graphics processing system, and to determine the appearance of the visible primitives at the sample positions. In some examples, a single sample position may correspond to a pixel position of the final rendered image, but in other examples, more than one (e.g. four) sample positions may correspond to each pixel position. Two stages of a typical graphics processing system are: (i) hidden surface removal (HSR), in which surfaces which are hidden by other surfaces in a scene are removed, and (ii) texturing and/or shading in which a surface of an object is given a suitable appearance. In a deferred rendering graphics processing system the hidden surface removal stage is implemented before the texturing/shading stage.

Figure 1:
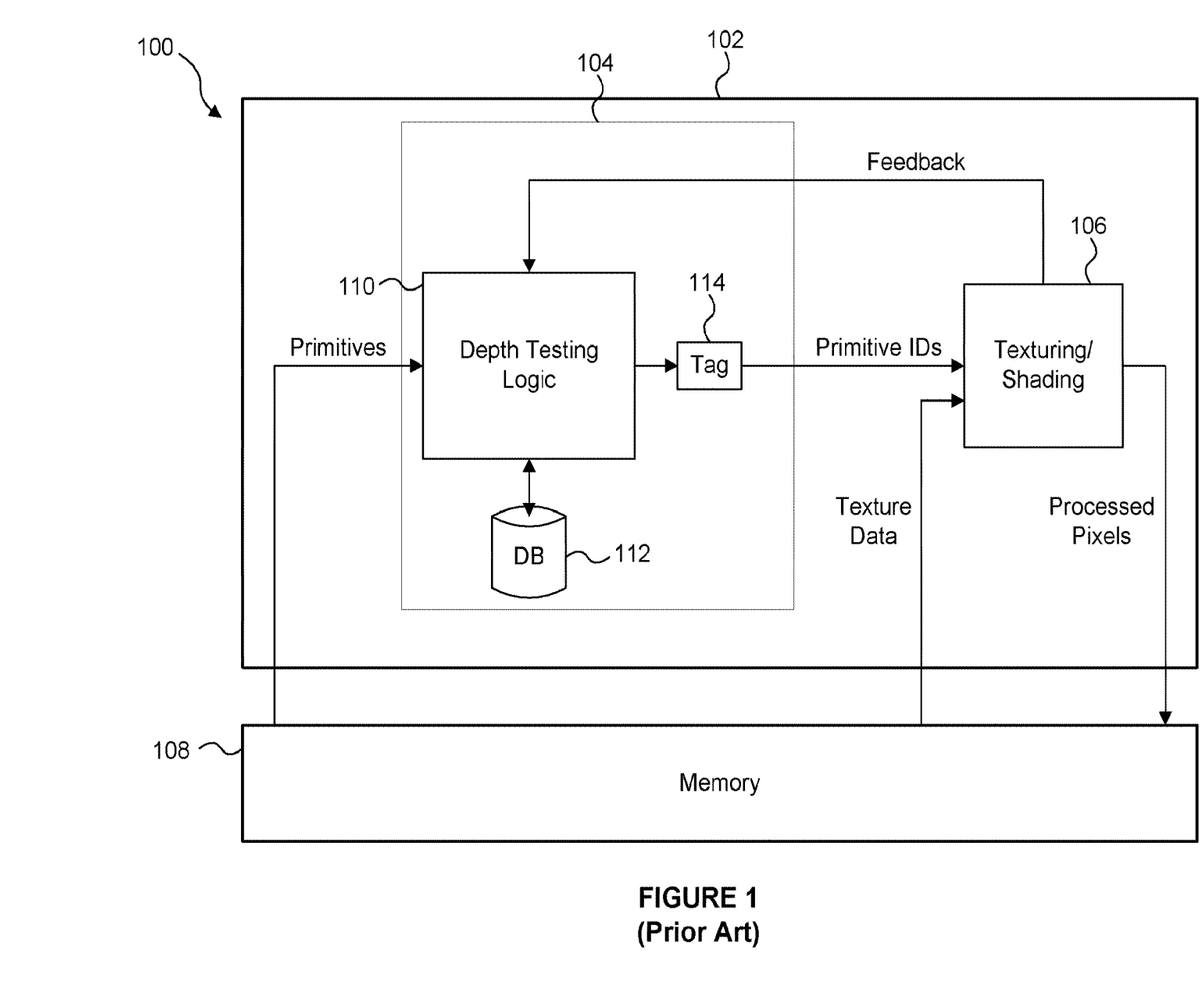
FIG. 1 is a schematic diagram of part of a graphics processing system of the prior art.

An example of part of a deferred rendering graphics processing system 100 is shown in FIG. 1. The system 100 comprises a graphics processing unit (GPU) 102 comprising a HSR module 104, and a fragment processing module 106 for performing texturing and/or shading on fragments of primitives. As a matter of terminology, a "fragment" is an element of a primitive at a sample position. The system 100 also comprises a memory 108 which is arranged to provide primitives to the GPU 102 and to receive processed pixels from the GPU 102. The HSR module 104 comprises depth testing logic 110, a depth buffer 112 and a tag buffer 114. In the deferred rendering system 100, the HSR module 104 is arranged to receive the primitives from the memory 108. The depth buffer 112 stores depth values for an array of sample positions to indicate the current depth at each sample position. The depth testing logic 110 uses the depth values stored in the depth buffer 112 to perform depth tests for incoming fragments to determine if the fragments are hidden by previously processed fragments. If the incoming fragments are not hidden then the appropriate depth values in the depth buffer 112 can be updated to reflect the depth of the incoming fragments. Fragments associated with an opaque object type or a translucent object type are resolved fragments, in the sense that the presence and/or depth values of these fragments will not be altered by the fragment processing module 106. As described below, the "presence" referred to here is presence in the primitive, rather than for example presence in a final image, where other factors, such as occlusion, may apply. Therefore, if the incoming fragments are opaque or translucent then the depth testing logic 110 will use the depth values of incoming fragments (which pass the depth test) to overwrite the depth values in the depth buffer 112. If the incoming fragments are opaque then the overwritten fragments can be discarded since they will not contribute to the final rendered image. However, if the incoming fragments are translucent then the overwritten fragments might still contribute to the final rendered image. Therefore, translucent fragments are processed such that a new translucent fragment value is combined with a previous fragment value using a blending equation that is indicated by the application. Typically the blending equation is implemented in the fragment processing module 106 and uses an alpha value that is sourced from a texture in order to determine how transparent the fragment is, in a process referred to as "alpha blending".

Other types of objects may include unresolved fragments. Fragment may be "unresolved" if the presence and/or depth values of the fragments may be altered by the fragment processing module 106. For example, fragments generated when a punch through object type arrives at the HSR module 104 are, initially, unresolved fragments because their presence is yet to be resolved by the fragment processing module 106. A primitive with a punch through object type may have holes (i.e. transparent areas) which are determined by texturing and shading operations. A fragment is said to be present in a primitive if it corresponds to an opaque area of the primitive, and not to be present if it corresponds to a transparent area of the primitive. Punch through object types should be processed by the HSR module such that it is possible to see through the holes left after the removal of any fragments that are determined not to be present. If a punch through fragment passes an initial depth test (based on comparing its depth value with the corresponding depth value in the depth buffer 112) then the punch through fragment is forwarded to the fragment processing module 106, but at that point the depth value in the depth buffer 112 is not updated, because the depth buffer 112 is arranged to hold only depth values for resolved fragments (i.e. depth values which will not be altered or invalidated by feedback from the fragment processing module 106) to ensure that the results of the depth tests are accurate. The fragment processing module 106 processes punch through fragments by performing a test (which may be referred to as an "alpha test") which indicates whether a fragment is "present" i.e. is part of the primitive, or not. In this way, the fragment processing module 106 resolves the presence of the punch through fragments. The alpha test for a fragment uses an alpha value that may be sourced from a texture in order to determine whether the fragment is present or not. The result of this test is fed back to the depth testing logic 110, as shown by the "feedback" in FIG. 1. If a fragment is determined not to be present (i.e. if the fragment fails the alpha test) then no depth value is written to the depth buffer 112 for that fragment. However, if the fragment is determined to be present (i.e. if the fragment passes the alpha test) then the feedback to the depth testing logic 110 indicates that the presence of the fragment has been resolved, such that the fragment may now be treated as a resolved fragment. The depth testing logic 110 can then update the depth buffer 112 with the depth value of the punch through fragment.

FIG. 1 shows that the tag buffer 114 is situated at the interface between the depth testing logic 110 and the fragment processing module 106. Tags are primitive identifiers which associate a fragment with the primitive of which it is a part, and which allow attributes such as texturing and shading data for the primitive to be fetched when required. The tag buffer 114 is used to hold tags for fragments from the front most primitives (e.g. those fragments which pass the depth test) for each sample position in the part of the rendering space currently being processed (e.g. in a tile when the system 100 is a tile-based system). Tags for opaque fragments which pass the depth tests are typically written into the tag buffer 114 even if they overwrite an existing tag as that corresponds to the correct operation to process opaque fragments, as described above. Fragments from translucent and punch through primitives may need to be combined with fragments that they overdraw. The combining of these fragments typically must be performed in the order that they were submitted by the application. As such, whenever translucent or punch through fragments are found to lie in front of fragments currently stored within the tag buffer 114, the HSR module 104 flushes currently visible tags to the fragment processing module 106. As described above, in the case of punch through fragments, the presence of fragments, and hence whether their depth values should be updated in the depth buffer 112, is determined by the fragment processing module 106. Therefore, tags for punch through primitives must also be flushed directly after any tags currently stored within the tag buffer 114 have been flushed. It is noted that the combination of a tag and a position in the tag buffer 114 defines a fragment, so the flushing of tags from the tag buffer 114 can be considered to be flushing fragments from the tag buffer 114. Conceptually, it makes sense to consider fragments being stored in the tag buffer 114 and fragments being flushed out to the fragment processing module 106. In a practical implementation, this conceptual flow of fragments is embodied by storing tags in the tag buffer 114 and flushing tags from the tag buffer 114.

It can be appreciated that in deferred rendering systems, such as system 100, objects with unresolved fragments (e.g. punch through objects) can affect the efficiency of the system. For example, when fragments of a punch through object are encountered the HSR module 104 cannot update the depth buffer 112 with the fragments' depth values until such time as it has received feedback from the fragment processing module 106, i.e. until the presence of the fragments has been resolved. This may have a number of detrimental consequences, such as:

- punch through fragments that are subsequently overdrawn by opaque fragments may be unnecessarily shaded by the fragment processing module 106 even though they will not contribute to the final rendered image, hence there is unnecessary processing being performed by the GPU 102;
- opaque fragments which follow punch through fragments cannot be processed until the results for the punch through fragments have been returned from the fragment processing module 106 to the HSR module 104, so there may be a stall in the processing while the depth values of the punch through fragments are resolved; and
- when the feedback is received at the HSR module 104 from the fragment processing module 106, the depth values for the punch through fragments that have been determined to be present need to be re-calculated so that the depth buffer 112 can be updated correctly.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a graphics processing system comprising: a first depth buffer configured to store depth values for resolved fragments for a plurality of sample positions within a rendering space of the graphics processing system; a second depth buffer configured to store depth values for unresolved fragments for the sample positions; and depth testing logic configured to receive primitive data relating to primitives and to perform depth tests on fragments of the primitives using depth values stored in at least one of the depth buffers; wherein the graphics processing system is configured to: (i) store, in the first depth buffer, the depth value of a fragment which passes a depth test if the fragment is a resolved fragment, and (ii) store, in the second depth buffer, the depth value of a fragment which passes a depth test if the fragment is an unresolved fragment.

There is also provided a method of processing primitives in a graphics processing system which comprises a first depth buffer configured to store depth values for resolved fragments for a plurality of sample positions within a rendering space of the graphics processing system, and a second depth buffer configured to store depth values for unresolved fragments for the sample positions, the method comprising: receiving primitive data relating to primitives at depth testing logic of the graphics processing system; performing depth tests on fragments of the primitives using depth values stored in at least one of the depth buffers; and storing the depth value of a fragment which passes a depth test in one of the depth buffers wherein, if the fragment is a resolved fragment then the depth value of the fragment is stored in the first depth buffer, and if the fragment is an unresolved fragment then the depth value of the fragment is stored in the second depth buffer.

There may also be provided computer readable code adapted to perform the steps of any of the methods described herein when the code is run on a computer. There may also be provided computer readable code for generating the graphics processing system of any of the examples described herein. The computer readable code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The inventor has realised that the efficiency with which a deferred rendering system processes objects with unresolved fragments (e.g. punch through objects) can be improved by using two depth buffers. In particular, a first depth buffer (which may be referred to herein as a primary depth buffer or PDB) is provided for storing depth values for resolved fragments, and a second depth buffer (which may be referred to herein as a secondary depth buffer or SDB) is provided for storing depth values for unresolved fragments. When a fragment passes a depth test, its depth value may be stored in the PDB if the fragment is a resolved fragment, and its depth value may be stored in the SDB if the fragment is an unresolved fragment. This may, for example, provide more opportunities for subsequent opaque objects to overwrite punch through fragments which passed a depth test, thereby reducing unnecessary processing which is performed on fragments which ultimately will not contribute to the final rendered image. As another example, recalculation of depth values for fragments which pass an alpha test may be avoided because the SDB stores the depth values of punch through fragments which are forwarded for alpha testing such that if the fragments pass the alpha test, the SDB may already have their depth values stored, and can use those (now resolved) depth values to update the PDB.

A fragment may be "unresolved" for different reasons. For example, a fragment may be unresolved if one or more of: (i) the depth of the fragment is not resolved, (ii) the presence of the fragment is not resolved, or (iii) the visibility of the fragment is not resolved. For example, an output-depth fragment (which may also be referred to as an "o-depth" fragment) is a fragment whose depth values can be altered by the texturing/shading process of a fragment shader. That is, o-depth fragments have shader-dependent depth values. In other words, o-depth fragments have unresolved depth values until a fragment processing module has resolved their depth values. As another example, the fragments of a punch through object have unresolved presence until an alpha test is performed (e.g. by a fragment processing module) to resolve their presence. As another example, which is described in more detail below, the visibility of a fragment may be unresolved if the depth value or presence of a previous fragment, which is located at the same sample position, is unresolved. In this case the visibility of the fragment cannot be resolved until the depth value or presence of the previous fragment has been resolved.

In contrast, a fragment may be "resolved" if its depth, presence and visibility are all resolved. For example, fragments associated with an opaque object type or a translucent object type are resolved fragments unless the visibility of the fragment is not resolved. In scenes consisting entirely of opaque and translucent objects, and without punch through or o-depth objects, all fragments are resolved.

Embodiments will now be described by way of example only.

Figure 2:
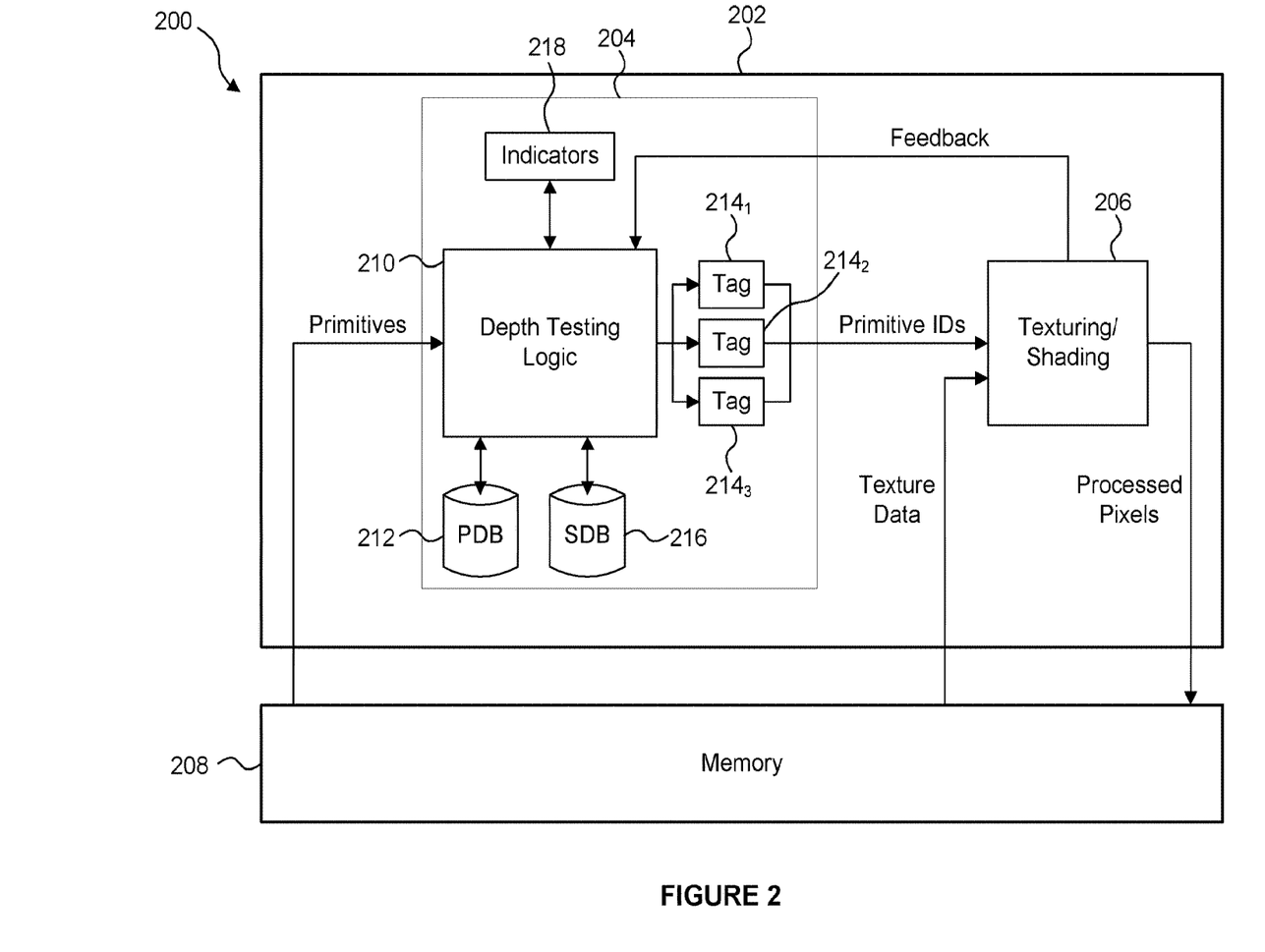
FIG. 2 is a schematic diagram of part of a graphics processing system implementing two depth buffers.

FIG. 2 shows an example of a graphics processing system 200 which comprises a GPU 202 and a memory 208. The GPU 202 includes a HSR module 204 configured to perform hidden surface removal on primitives, and a fragment processing module 206 configured to perform one or both of shading and texturing on fragments. The graphics processing system 200 is a deferred rendering system in the sense that the fragment processing module 206 is arranged to act on fragments after the HSR module 204. The memory 208 is arranged to provide primitives to the GPU 202 and to receive processed pixels from the GPU 202. The HSR module 204 comprises depth testing logic 210, a first depth buffer 212 (which is referred to herein as a primary depth buffer or "PDB"), a set of three tag buffers $214_1$, $214_2$ and $214_3$, a second depth buffer 216 (which is referred to herein as a secondary depth buffer or "SDB") and a store for storing a set of indicators 218 which, as described in more detail below, indicate which of the depth buffers to use for depth tests in the HSR module 204. In the deferred rendering system 200, the HSR module 204 is arranged to receive the primitives from the memory 208, the fragment processing module 206 is arranged to receive texture data from the memory 208 and to provide processed pixel values to the memory 208.

The HSR module 204 maintains the PDB 212 and the SDB 216 such that the PDB 212 holds the current fully resolved depth values for sample positions of a rendering space, and the SDB 216 contains the front-most depth values of unresolved fragments (e.g. associated with punch through objects) for the sample positions of the rendering space, where those fragments have passed a depth test and have not currently been overdrawn. The PDB 212 and the SDB 216 store depth values for the same sample positions of the rendering space. For example, if the system 200 is a tile-based graphics system then the rendering space for rendering a whole image is divided into a plurality of blocks or "tiles", which are typically rectangular and may for example each include a 32×32 block of sample positions. Tiles may be other sizes and/or shapes, for examples each tile may include a block of 16×16 or 32×16 sample positions. In tile-based graphics systems, the PDB 212 and SDB 216 may store depth values corresponding to one tile within the rendering space. In other examples, the graphics processing system is not tile-based, in which case the PDB 212 and SDB 216 may store depth values corresponding to the whole rendering space used to render an image.

The use of the secondary depth buffer 216 to store depth values for unresolved fragments, e.g. for punch through fragments which have passed a depth test, means that it is possible for subsequent objects to be tested against the depth values of the punch through fragments and for the punch through fragments to potentially be discarded if they are overdrawn by opaque fragments, and this is achieved without needing to submit the punch through fragments to the fragment processing module 206.

Figure 3A:
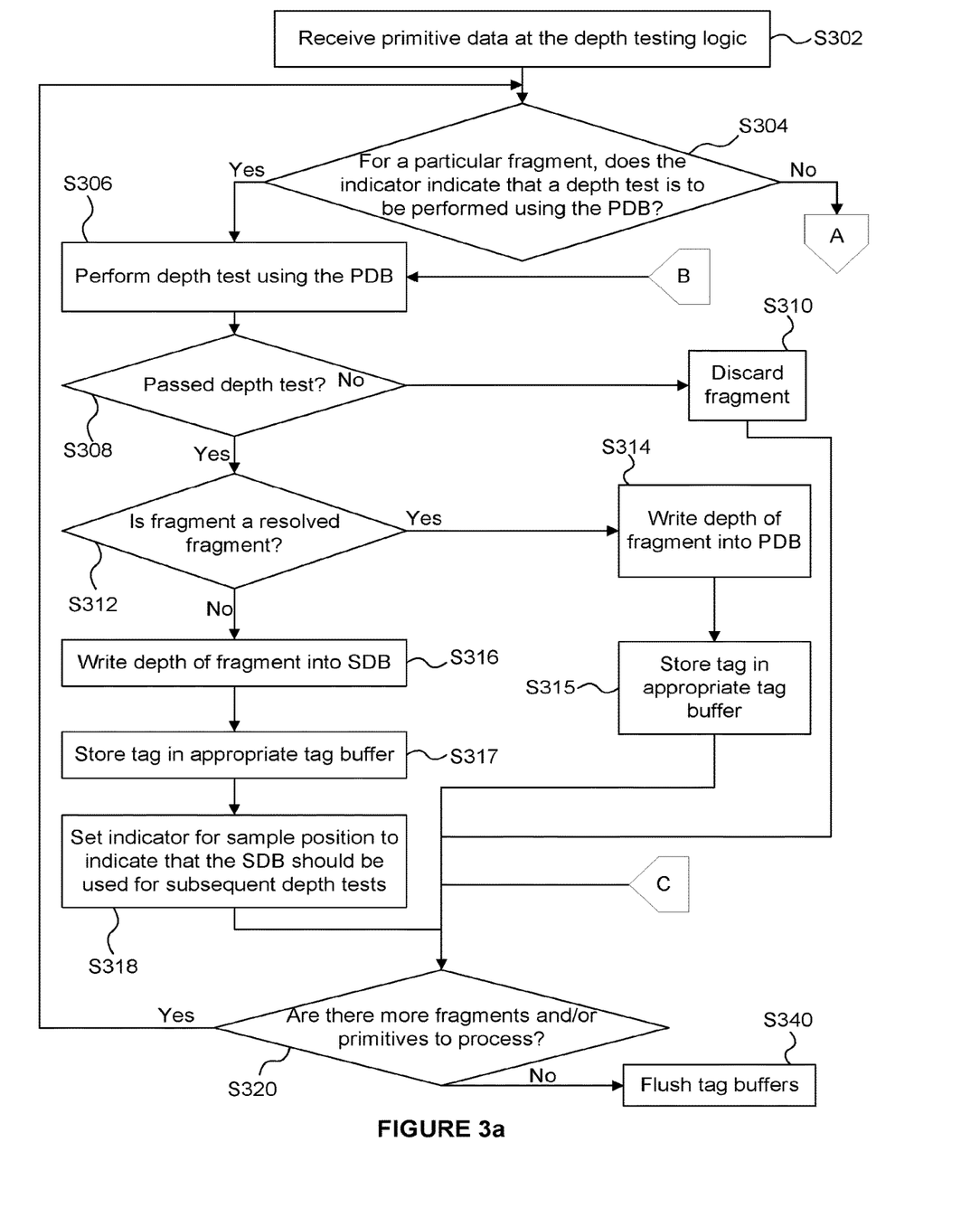
FIGS. 3a and 3b show a flow chart illustrating a method of processing primitives in a graphics processing system.
Figure 3B:
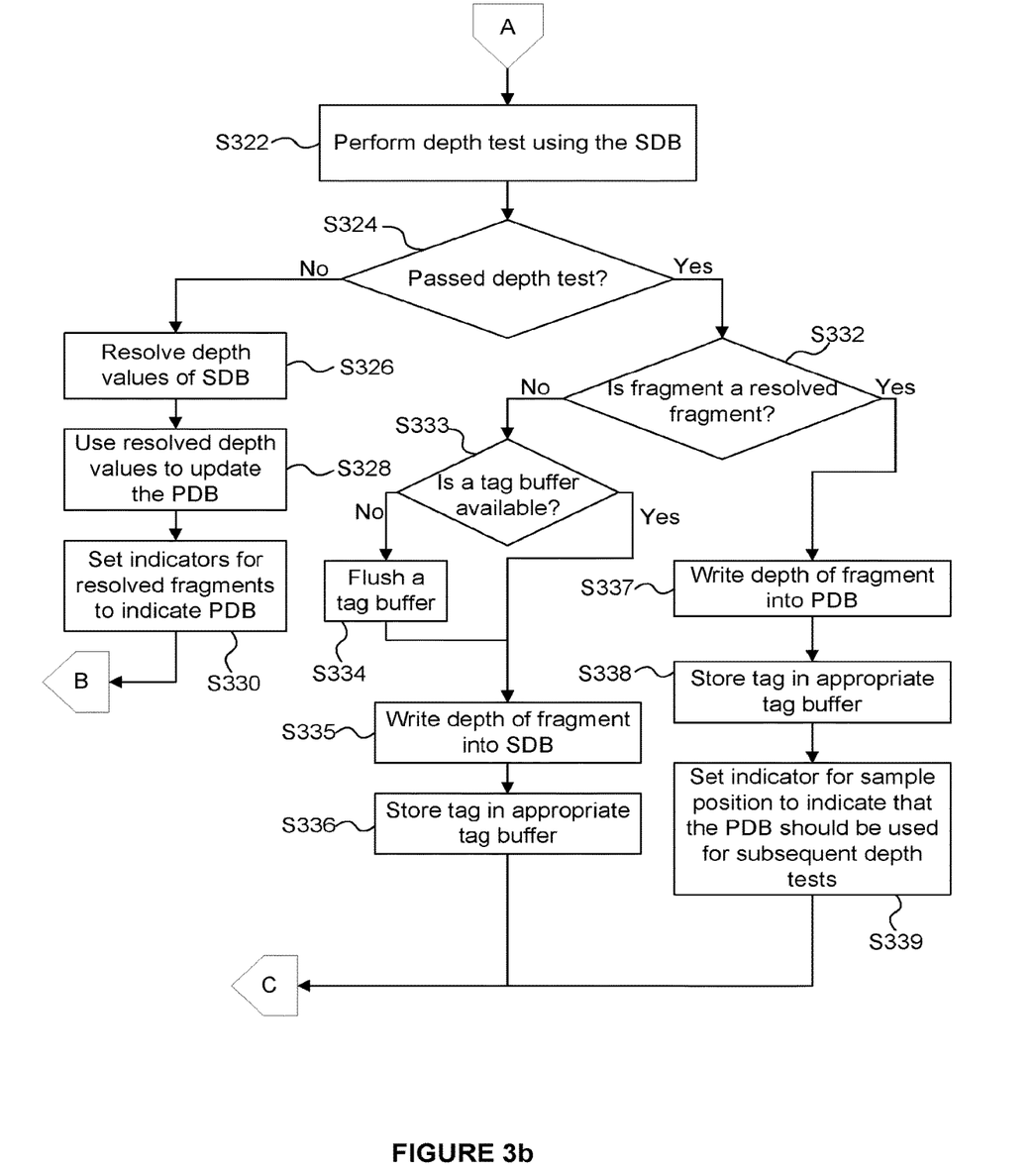

The operation of the graphics processing system 200 for processing primitives is described below with reference to the flow chart shown in FIG. 3.

In step S302 primitives are received at the depth testing logic 210 from the memory 208. The primitives which are received at the depth testing logic 210 may be in any suitable space for rasterization, such as screen-space for rendering an image, or shadow map space for rendering a shadow map. For example, it may be the case that previous operations have been performed in the system 200 in order to determine the primitives in screen-space. Furthermore, prior to step S302, if the graphics processing system 200 is a tile-based system then a tiling operation may have been performed to determine which primitives are relevant for which tiles, whereby the primitives for one tile may be provided to the depth testing logic 210, then the primitives for another tile may be provided to the depth testing logic 210, and so on. The actual data describing the primitives which is passed from the memory 208 to the depth testing logic 210 might not include all of the data relating to a primitive, and may for example include the positional data of the primitives (e.g. the screen-space positions of vertices of the primitives) but might not include the texture or shading data for the primitive. Even though some of the data for the primitives might not be passed from the memory 208 to the HSR module 204, conceptually it makes sense to think of the primitives being passed from the memory 208 to the depth testing logic 210.

The indicators 218 indicate, for each of the sample positions of the rendering space (e.g. each sample position of a current tile), which of the depth buffers the depth testing logic 210 is to use for performing a depth test. For example, each of the indicators may be associated with a respective one of the sample positions. For example, each indicator may be a flag which indicates either the PDB 212 or the SDB 216. In this example, each indicator represents one of two possible options and as such can be represented with a binary flag. The system 200 initialises the indicators 218 to indicate the PDB 212 for each sample position of the rendering space before any primitive data relating to primitives in the rendering space is received at the HSR module 204.

In step S304, for a fragment of a received primitive, the depth testing logic 210 uses the appropriate one of the indicators 218 to determine whether the PDB 212 or the SDB 216 should be used for the depth test on the fragment. In examples described herein, the indicator 218 indicates the PDB 212 when the front-most depth at a particular sample position is stored in the PDB and is that of a resolved fragment, whereas the indicator 218 indicates the SDB 216 when the front-most depth at the particular sample position is stored in the SDB and is the depth of a fragment that is yet to be resolved.

If the indicator indicates the PDB 212, then the method passes from step S304 to S306 in which the depth testing logic 210 performs a depth test on the fragment using the appropriate depth value stored in the PDB 212. Depth tests are known in the art, and usually involve comparing the depth value of a fragment with a corresponding depth value stored in a depth buffer. The result of a depth test depends upon a depth compare mode (DCM) in which the depth testing logic 210 is operating. For example, the DCM may be DCM_LESS_EQ in which the fragment will pass the depth test if its depth value is less than or equal to the depth value stored in the depth buffer 212 at the corresponding sample position. This is a common depth compare mode because this intuitively corresponds to testing whether a fragment is closer to a viewpoint than (i.e. in front of) previously processed fragments at the corresponding sample position when using the common convention that smaller depth values indicate that an object is closer, and larger depth values indicate that an object is further away. As another example, the DCM may be DCM_GREATER in which the fragment will pass the depth test if its depth value is greater than the depth value stored in the depth buffer 212 at the corresponding sample position. A person skilled in the art would understand that there are other depth compare modes (e.g. DCM_LESS, DCM_GREATER_EQ, DCM_EQUAL, DCM_ALWAYS and DCM_NEVER) and would understand how to implement the depth test according to the depth compare mode which is currently set.

In step S308 the depth testing logic 210 determines whether the fragment passed the depth test. As described above, the PDB 212 stores depth values for resolved fragments, so if a fragment fails a depth test against the PDB 212 then it will not contribute to the final rendered image and can be discarded. Therefore, if the fragment failed the depth test the method passes from step S308 to step S310 in which the depth testing logic 210 discards the fragment. It is noted that step S310 might not be an active step. That is, the fragment may be discarded simply by not storing its depth or identifier in any of the buffers in the HSR module 204. Following step S310 the method passes to step S320 in which it is determined whether there are any more fragments and/or primitives to process in the depth testing logic 210, for which the method of depth testing is to be repeated.

If the fragment passes the depth test against the PDB 212 then the method passes from step S308 to step S312 in which the depth testing logic 210 determines whether the fragment is a resolved fragment. As described above, opaque and translucent fragments are usually resolved fragments because neither their presence nor depth values will be altered by the fragment processing module 206, but punch through fragments are unresolved fragments before the presence of the fragments is resolved because their presence may be altered by the fragment processing module 206, e.g. they may depend upon an alpha test performed by the fragment processing module 206. Furthermore, o-depth fragments are unresolved fragments because their depth values may be altered by the fragment processing module 206. If the fragment is a resolved fragment then in step S314 the depth testing logic 210 uses the depth value of the fragment to update the PDB 212. That is, in step S314, the depth testing logic 210 stores the depth value of the fragment in the PDB 212. This may involve overwriting a depth value that was previously stored in the PDB 212 at the corresponding sample position.

As described above, the HSR module 204 includes three tag buffers $214_1$ to $214_3$. At a given time, a first one of the tag buffers (e.g. tag buffer $214_1$) is configured to store primitive identifiers for the fragments whose depth values are stored in the PDB 212; a second one of the tag buffers (e.g. tag buffer $214_2$) is configured to store primitive identifiers for the fragments whose depth values are stored in the SDB 216; and a third one of the tag buffers (e.g. tag buffer $214_3$) is configured to store primitive identifiers for fragments which are in the process of being flushed from the HSR module 204 to the fragment processing module 206 which is described in more detail below. The functions of the different tag buffers is not fixed and for example may change dynamically as the system 200 processes primitives. For example, if, at a first point in time, the tag buffer $214_2$ is storing tags for the depth values stored in the SDB 216 and then the contents of the tag buffer $214_2$ are flushed to the fragment processing module 206 then the tag buffer $214_3$ may be used to store tags for the depth values stored in the SDB 216 while the tag buffer $214_2$ is being flushed.

In step S315, which follows step S314, a corresponding tag of the primitive of which the fragment is a part is stored in the appropriate tag buffer (e.g. tag buffer $214_1$ if that is the tag buffer which is currently storing tags corresponding to the depth values stored in the PDB 212).

Following step S315 the method passes to step S320 in which it is determined whether there are any more fragments and/or primitives to process in the depth testing logic 210, for which the method of depth testing is to be repeated.

If the fragment is an unresolved fragment (e.g. if the fragment is a punch through fragment) then the method passes from step S312 to step S316 in which the depth testing logic 210 uses the depth value of the fragment to update the SDB 216. That is, in step S316, the depth testing logic 210 stores the depth value of the fragment in the SDB 216. In this example, step S316 should not involve overwriting a valid depth value that was previously stored in the SDB 216 because if there was already a depth value at the corresponding sample position in the SDB 216 then the indicator 218 would be set such that the method would have passed from step S304 to step S322 (which is described below) rather than passing from step S304 to step S306. Furthermore, in step S317, which follows step S316, a corresponding tag of the primitive of which the fragment is a part is stored in the appropriate tag buffer (e.g. tag buffer $214_2$ if that is the tag buffer which is currently storing tags corresponding to the depth values stored in the SDB 216).

In step S318 the depth testing logic 210 sets the indicator for the fragment's sample position to indicate the SDB 216.

This means that subsequent depth tests at the sample position will be performed using the depth value stored in the SDB 216. Following step S318 the method passes to step S320 in which it is determined whether there are any more fragments and/or primitives to process in the depth testing logic 210, for which the method of depth testing is to be repeated. If there are more fragments which have been received at the depth testing logic 210 for processing then the method passes back to step S304 and the method continues for another fragment. Although the description of the method shown in FIG. 3 implies that the method is performed for one fragment and then subsequently the method is performed for the next fragment in a serial manner, in some examples multiple fragments may be processed in parallel to speed up the processing of large numbers (e.g. millions or billions) of fragments which may be present in a scene.

If in step S304, the depth testing logic 210 determines that the SDB 216 should be used for the depth test on a fragment then the method passes from step S304 to step S322. As described above, the indicator 218 will indicate the SDB 216 if there is a valid depth value stored in the SDB 216 for the sample position of the fragment in question.

In step S322 the depth testing logic 210 performs a depth test on the fragment using the appropriate depth value stored in the SDB 216. In step S324 the depth testing logic 210 determines whether the fragment passed the depth test. As described above, the SDB 216 stores depth values for unresolved fragments, so if a fragment fails a depth test against the SDB 216 then in step S326 the depth values of the SDB 216 are resolved. This is because the depth test of step S322 was with respect to an uncertain (i.e. unresolved) value, which needs to be resolved before a decision can be made about whether the current fragment should be kept or discarded. It should be noted that the depth values in the SDB 216 may be invalidated by the fragment processing module 206 so it is possible that a fragment which fails a depth test against the SDB 216 could contribute to the final rendered image. In order to resolve the depth values of the SDB 216, the tags from the one of the tag buffers 214 (e.g. tag buffer $214_2$) which stores tags corresponding to the depth values in the SDB 216 are flushed to the fragment processing module 206. When the flushed fragments are punch through fragments, the fragment processing module 206 can perform alpha tests on the flushed fragments in order to determine which of the punch through fragments are present. In this way the depth values are resolved by determining the presence or otherwise of the respective fragments, and the resolved depth values of the present fragments are fed back to the depth testing logic 210. In step S328 the depth testing logic 210 updates the depth values in the PDB 212 with the resolved depth values received from the fragment processing module 206. Since the depth values have been resolved and stored in the PDB 212, in step S330 the indicators for the sample positions from which the tags were flushed in step S326 are set to indicate the PDB 212 such that further depth tests at those sample positions are performed based on the resolved depth values in the PDB 212. The depth values in the SDB 216 can be discarded once the depth values have been resolved and stored in the PDB 212. Alternatively, rather than discarding the depth values in the SDB 216, the depth values in the SDB 216 can be invalidated by setting the indicators for the appropriate sample positions to indicate the PDB 212.

The method can then proceed to step S306 in which a depth test is performed for the fragment using the resolved depth values stored in the PDB 212. The method then proceeds as described above from step S306. It is noted that the method may stall while the depth values from the SDB 216 are resolved by the fragment processing module 206, but it is also noted that such stalls will occur less frequently than in the prior art system 100 described above. That is, in the system 100, a stall occurs when an unresolved fragment passes a depth test against the depth buffer 112. In contrast, in the system 200, when an unresolved fragment passes a depth test against the primary depth buffer 212 the depth value of the unresolved fragment is stored in the SDB 216 with no stall at that point. If a subsequent opaque fragment passes the depth test against the SDB 216 then no stall will occur due to the unresolved fragment. If a fragment fails a depth test against the SDB 216 a stall may occur, and as described in more detail below, even in that situation a stall may be avoided in some examples.

Returning to step S324, if the fragment passes the depth test against the SDB 216 then the method passes from step S324 to step S332 in which the depth testing logic 210 determines whether the fragment is a resolved fragment. If the fragment is an unresolved fragment (e.g. if it is a punch through fragment) then in step S333 the HSR module 204 determines if a tag buffer is currently not in use and therefore available. If there is an available tag buffer (e.g. tag buffer $214_3$) then the method passes to step S335. However, if there is not an available tag buffer (e.g. all three of the tag buffers $214_1$ to $214_3$ are currently in use) then one of the tag buffers is flushed to the fragment processing module 206. The tag buffer which is flushed may be chosen to be a tag buffer associated with the SDB 216. Furthermore, as an example, if more than one tag buffer is associated with the SDB 216 to represent multiple layers then the tag buffer associated with the SDB 216 and corresponding to the furthest of the layers may be chosen to be flushed in step S334. The flushing of a tag buffer in step S334 makes the tag buffer available and then the method passes to step S335. In step S335 the depth testing logic 210 uses the depth value of the fragment to update the SDB 216. That is, in step S335, the depth testing logic 210 stores the depth value of the fragment in the SDB 216. This may involve overwriting a depth value that was previously stored in the SDB 216 at the corresponding sample position. In step S336, the tag of the fragment is written into the available tag buffer 214 (e.g. tag buffer $214_3$). By either holding the tag of the overwritten fragment in a tag buffer, or sending it to the fragment processing module 206 to be resolved, these steps ensure that the tag of the overwritten fragment, which may still contribute to the final image, is not discarded. Therefore, when step S336 has been performed, the depth values stored in the SDB 216 are the depth values of the closest unresolved fragments, and the tags stored in the tag buffers are the tags for respective layers of fragments waiting to be resolved, thereby allowing the order of the layers to be maintained. Following step S336 the method passes to step S320 in which it is determined whether there are any more fragments and/or primitives to process in the depth testing logic 210, for which the method of depth testing is to be repeated.

If the fragment is a resolved fragment (e.g. if it is an opaque or translucent fragment) then the method passes from step S332 to step S337 in which the depth testing logic 210 uses the depth value of the fragment to update the PDB 212. That is, in step S337, the depth testing logic 210 stores the depth value of the fragment in the PDB 212. This may involve overwriting a depth value that was previously stored in the PDB 212 at the corresponding sample position. The depth value stored at the corresponding sample position in the SDB 216 may be discarded since the current fragment has overwritten that depth value with a resolved depth value. If the fragment is an opaque fragment then it will overwrite the other fragments at the sample position so, in step S338 a tag of the primitive of which the fragment is a part is stored in the appropriate tag buffer (e.g. tag buffer $214_1$ if that is the tag buffer which is currently storing tags corresponding to the depth values stored in the PDB 212) and the tags in the other tag buffers are marked as invalid. However, if the fragment is a translucent fragment then the underlying fragments cannot simply be overwritten, so the tag of the translucent fragment is stored in a new tag buffer (e.g. tag buffer $214_3$). If there are no new tag buffers available to store the tag of the current fragment then one of the tag buffers 214 may be flushed thereby making the tag buffer available to store the tag of the current fragment. It is noted that any punch through fragment that is overdrawn by a translucent fragment can be treated as a "normal" translucent fragment (i.e. a resolved fragment) by the HSR module 204 because, having already been overdrawn, its depth/presence no longer needs to be resolved at the HSR module 204.

In step S339 the depth testing logic 210 sets the indicator for the fragment's sample position to indicate the PDB 212. This means that subsequent depth tests at the sample position will be performed using the depth value of the current fragment that was stored in the PDB 212 in step S337. Following step S338 the method passes to step S320 in which it is determined whether there are any more fragments and/or primitives to process in the depth testing logic 210, for which the method of depth testing is to be repeated.

If it is determined in step S320 that there are currently no more fragments to process then the method passes to step S340 in which the tags stored in the tag buffers 214 are flushed to the fragment processing module 206. The fragment processing module 206 can then process the fragments indicated by the flushed tags, e.g. to apply texturing and/or shading to the fragments. The processing performed by the HSR module 204 as shown in FIGS. 3a and 3b can be repeated when further primitives are received at the HSR module 204.

It can therefore be seen that, in comparison with the prior art system 100, the use of the secondary depth buffer 216 allows for a reduction in the number times that the HSR module 204 needs to stall to wait for unresolved fragment to be resolved by the fragment processing module 206. This also reduces the amount of processing (e.g. alpha testing) that the fragment processing module 206 needs to perform to resolve the unresolved fragments. This is because unresolved fragments, such as punch through fragments, can have their depth values stored in the SDB 216 such that they can be subsequently overwritten by opaque or translucent fragments without needing to resolve the presence of the punch through fragments. In other words, in examples described herein, the HSR module 204 does not flush the tags of unresolved fragments to the fragment processing module 206 until those unresolved fragments need to be resolved, thereby providing more opportunities for those unresolved fragments to be hidden by subsequent fragments such that those unresolved fragments do not need to be resolved. Furthermore, for punch through fragments which pass the alpha test in the fragment processing module 206, when the feedback is received at the HSR module 204, the SDB 216 already has the depth values of the punch through fragments stored therein, so there is no need to re-calculate the depth values of the fragments as would have been required by prior art system 100.

Figure 4:
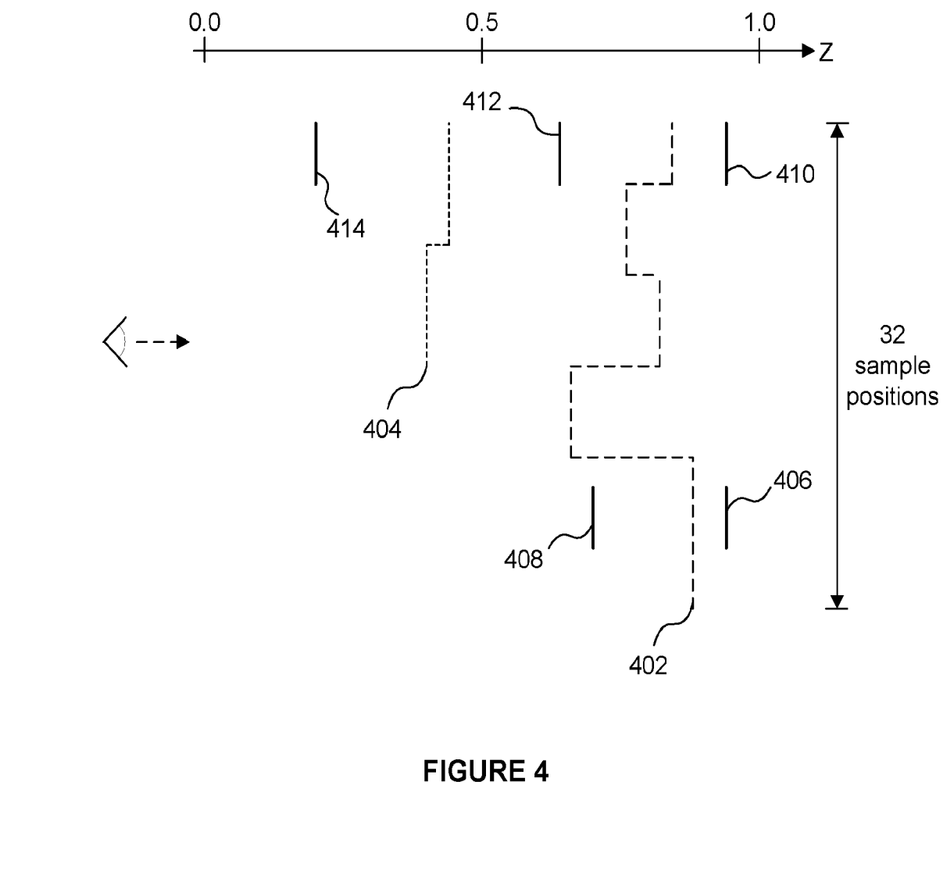
FIG. 4 represents the depth values of first and second depth buffers as well as depth values of incoming primitives for a column of 32 sample positions in part of a rendering space.

FIG. 4 shows an example of the depth values of the PDB 212 and the SDB 216 as well as depth values of incoming fragments, which helps to illustrate the operation of the system 200. In the example shown in FIG. 4, the allowed depth values range from 0.0 to 1.0 and the viewpoint is shown on the left of FIG. 4 such that smaller depth values correspond to closer depths. Depth values for a column of 32 sample positions are shown in FIG. 4. The dashed line 402 represents the depth values stored in the PDB 212 for the column of 32 sample positions at a particular point in time. The dashed line 404 represents the depth values stored in the SDB 216 for the column of 32 sample positions at the same particular point in time. As shown by line 404 in FIG. 4, depth values for some, but not all, of the sample positions are stored in the SDB 216. The indicators 218 will indicate the SDB 216 for the sample positions in which a depth value is stored in the SDB 216 and will indicate the PDB 212 for sample positions in which a depth value is not stored in the SDB 216. In the example shown in FIG. 4 the depth compare mode is DCM_LESS_EQ such that a fragment will pass a depth test if it has a depth value that is less than or equal to the depth value stored in a depth buffer.

A group of fragments 406 of a first primitive may be received at the depth testing logic 210. As shown in FIG. 4, the sample positions of the fragments 406 are such that the indicators 218 will indicate that the depth tests should be performed using the PDB 212. When the depth testing logic 210 performs the depth tests on the fragments 406 in the DCM_LESS_EQ depth compare mode, the fragments 406 will fail the depth tests because their depth values are greater than the corresponding depth values stored in the PDB 212, as shown by line 402. Therefore, the fragments 406 will be discarded since they will not contribute to the final image.

A different group of fragments 408 of a second primitive may be received at the depth testing logic 210 when the depth values stored in the PDB 212 and the SDB 216 are shown by the lines 402 and 404 respectively. As shown in FIG. 4, the sample positions of the fragments 408 are such that the indicators 218 will indicate that the depth tests should be performed using the PDB 212. When the depth testing logic 210 performs the depth tests on the fragments 408 in the DCM_LESS_EQ depth compare mode, the fragments 408 will pass the depth tests because their depth values are less than the corresponding depth values stored in the PDB 212, as shown by line 402. If the fragments 408 are opaque or translucent (i.e. if they are resolved fragments) then the depth values of the fragments 408 will be written into the PDB 212 whereas if the fragments 408 are punch through (i.e. if they are unresolved fragments) then the depth values of the fragments 408 will be written into the SDB 216 and the indicators 218 for the sample positions of the fragments 408 will be set to indicate the SDB 216. The tags for the fragments 408 will be written into the appropriate one of the tag buffers 214.

A different group of fragments 410 of a third primitive may be received at the depth testing logic 210 when the depth values stored in the PDB 212 and the SDB 216 are shown by the lines 402 and 404 respectively. As shown in FIG. 4, the sample positions of the fragments 410 are such that the indicators 218 will indicate that the depth tests should be performed using the SDB 216. When the depth testing logic 210 performs the depth tests on the fragments 410 in the DCM_LESS_EQ depth compare mode, the fragments 410 will fail the depth tests because their depth values are greater than the corresponding depth values stored in the SDB 216, as shown by line 404. Therefore, the depth values in the SDB 216 are resolved by flushing the corresponding fragments of the SDB 216 to the fragment processing module 206. When the resolved depth values are received from the fragment processing module 206, the depth testing logic 210 updates the PDB 212 using the resolved depth values and the fragments 410 are re-tested against the depth values in the PDB 212. If punch through fragments are resolved by the fragment processing module 206 to be present then the corresponding depth values of the PDB 212 are updated to have the depth shown by line 404, but for punch through fragments which are not present the corresponding depth values of the PDB 212 remain at line 402. The depths of o-depth fragments may be resolved by the fragment processing module 206 to be different to those shown by line 404, so a comparison between the resolved o-depth values and the depth values in the PDB 212 (shown by line 402) may be performed to determine how to update the depth values in the PDB 212 accordingly, e.g. by updating the depth values to be the lesser of the resolved o-depth values and the previous depth values in the PDB 212 (shown by line 402). The fragments 410 will fail the depth test against the PDB 212 and hence will be discarded.

A different group of fragments 412 of a fourth primitive may be received at the depth testing logic 210 when the depth values stored in the PDB 212 and the SDB 216 are shown by the lines 402 and 404 respectively. As shown in FIG. 4, the sample positions of the fragments 412 are such that the indicators 218 will indicate that the depth tests should be performed using the SDB 216. When the depth testing logic 210 performs the depth tests on the fragments 412 in the DCM_LESS_EQ depth compare mode, the fragments 412 will fail the depth tests because their depth values are greater than the corresponding depth values stored in the SDB 216, as shown by line 404. Therefore, the depth values in the SDB 216 are resolved by flushing the corresponding fragments of the SDB 216 to the fragment processing module 206. When the resolved depth values are received from the fragment processing module 206, the depth testing logic 210 updates the PDB 212 with the resolved depth values and the fragments 412 are re-tested against the depth values in the PDB 212. Depending on the results of the resolving of the depth values from the SDB 216, some or all of the fragments 412 may pass the depth tests against the PDB 212, while the remainder may fail. Fragments 412 that fail the depth test against the PDB 212 are discarded and fragments 412 that pass the depth test are not discarded. As described above, if fragments 412 that pass the depth test are opaque or translucent (i.e. if they are resolved fragments) then the depth values of the fragments 412 will be written into the PDB 212 and the indicators 218 for the sample positions of the fragments 408 will be set to indicate the PDB 216, whereas for fragments 412 that pass the depth test and are punch through (i.e. if they are unresolved fragments) then the depth values of the fragments 412 will be written into the SDB 216. The tags for the fragments 412 will be written into the appropriate one of the tag buffers 214 if the fragments 412 pass the depth test.

A different group of fragments 414 of a fifth primitive may be received at the depth testing logic 210 when the depth values stored in the PDB 212 and the SDB 216 are shown by the lines 402 and 404 respectively. As shown in FIG. 4, the sample positions of the fragments 414 are such that the indicators 218 will indicate that the depth tests should be performed using the SDB 216. When the depth testing logic 210 performs the depth tests on the fragments 414 in the DCM_LESS_EQ depth compare mode, the fragments 414 will pass the depth tests because their depth values are less than the corresponding depth values stored in the SDB 216, as shown by line 404. If the fragments 414 are resolved fragments (e.g. if they are opaque or translucent fragments) then their depth values are written into the PDB 212 and the indicators for the corresponding sample positions are set to indicate that subsequent depth tests should be performed using the PDB 212. If the resolved fragments 414 are opaque then the depth values in the SDB 216 for the corresponding sample positions could be discarded and the tags for the overwritten fragments could be discarded from the relevant tag buffer. In this way the overwritten fragments would not need to be flushed to the fragment processing module 206, which can reduce stalling and unnecessary fragment processing in the system 200. If the resolved fragments 414 are translucent then the fragments which lie behind the fragments 414 may be flushed to the fragment processing module 206 if necessary to ensure that there is an available tag buffer to store tags for the fragments 414. If the fragments 414 are unresolved fragments then their depth values are stored in the SDB 216. The tags for the fragments 414 will be written into one of the tag buffers 214. As described above, tag buffers may be used to store tags of different layers of fragments, and if there is not an available tag buffer to store the tags for the fragments 414, one of the tag buffers may need to be flushed so that it can be used to store the tags for the fragments 414.

In the examples described above when a fragment fails a depth test against the SDB 216 (e.g. as determined in step 324) then the depth values stored in the SDB 216 and/or presence of the respective fragments are resolved and used to update the PDB 212, and a second depth test is then performed on the fragment using the appropriate depth value stored in the PDB 212 after the updating of the depth values in the PDB 212 (in steps S326, S328 and S306). However, in other examples, if a fragment fails a depth test performed using a depth value stored in the SDB 216, then the depth testing logic 210 may perform a second depth test on the fragment using the appropriate depth value stored in the PDB 212. This could be appropriate for fragments 410 and 412 shown in FIG. 4. If the fragment fails the depth test against the PDB 212 then the fragment could be discarded (e.g. for fragments 410). This avoids the need to resolve the depth values in the SDB 216 when the fragments 410 fail the depth test against the SDB 216, but it may incur extra depth testing in the HSR module 204. In particular, if the fragment passes the depth test against the PDB 212 after failing the depth test against the SDB 216 (e.g. fragments 412 would pass the depth test against the PDB 212) then the depth values stored in the SDB 216 can be resolved and used to update the depth values in the PDB 212. Then a third depth test could be performed on the fragment using the appropriate depth value stored in the PDB 212 after the updating of the depth values in the PDB 212.

In the methods described above with reference to FIG. 3, a stall occurs in the processing of opaque and translucent fragments that are found to lie behind punch through fragments (that is, they fail the depth test against the SDB at S324), whilst the depth values of the punch through fragments are resolved. In other examples, it is possible to remove this stall, as described below. In these examples, when a fragment fails a depth test against the SDB 216 then the fragments in the tag buffer associated with the SDB 216 are flushed to the fragment processing module 206. Rather than stalling to wait for the fragment processing module 206 to process the flushed fragments, the values in the SDB 216 are cleared and the indicators are all set to indicate the PDB 212 and then depth testing continues for further incoming fragments, and if the depth values pass the depth tests they are written into the SDB 216 (not the PDB 212). This is how the HSR module 204 processes opaque and translucent fragments (i.e. fragments which would normally be considered to be resolved fragments). The results are written into the SDB 216 because until the feedback is returned from the fragment processing module 206 the visibility of a fragment which passes a depth test is not known, and therefore the incoming fragments may be considered "unresolved" fragments (i.e. they have unresolved visibility) for which the depth values are stored in the SDB 216 as described herein. This means that while the HSR module 204 is waiting for the feedback from the fragment processing module 206 any incoming fragments are unresolved fragments because their visibility is unresolved. When the feedback is received from the fragment processing module 206, the returned resolved depth values are compared with those now in the SDB 216 to determine resolved depth values which can then be stored in the PDB 212 and the relevant tags can be stored in the tag buffer 214 which is currently associated with the PDB 212.

However, if fragments which would normally be considered to be unresolved fragments (e.g. punch through or o-depth fragments) are received at the depth testing logic 210 before the feedback from the fragment processing module 206 is received then the depth testing logic 210 will stall until the feedback is received. Therefore, a stall can be prevented while waiting for feedback if opaque or translucent fragments are received at the depth testing logic 210, but a stall is not prevented if a punch through or o-depth fragment is received while waiting for feedback.

In the examples described above there are three tag buffers 214$_1$, 214$_2$ and 214$_3$. In other examples there may be more than three tag buffers which allows for more layers of fragments to be stored before tags are flushed to the fragment processing module 206. This may reduce the number of flushes that are performed since there would be more opportunity for opaque fragments to overwrite fragments before they are flushed. However, the use of more tag buffers would require more memory on the GPU 202, so when choosing the number of tag buffers there is a trade-off between reducing the number of flushes and reducing the memory requirements on the GPU 202.

Punch through fragments may be further divided into two types: (i) opaque punch through (OPT) fragments which are either present and fully opaque or not present, or (ii) translucent punch through (TPT) fragments which can be present or not present but for which the present fragments may be translucent (i.e. not fully opaque). As described below, where multiple layers of overlapping OPT fragments are stored in multiple tag buffers, it is possible to control the order in which the tag buffers are flushed in a non-conventional way to gain some efficiency. If a location within the rendering space has a depth value stored in the SDB 216 when a new OPT fragment is determined to be in front of the currently stored depth (in the SDB 216), then rather than flushing the fragments from the tag buffer associated with the SDB 216 it is possible to use additional tag buffers to store layers of OPT fragments. A per-fragment front-most tag buffer ID can be maintained (e.g. stored in an array) and used to determine which OPT fragments are the front most. The front-most OPT fragments can be flushed to the fragment processing module 206 first (contrary to rigidly following submission order as is conventional). If the front most OPT fragment at a sample position is determined to be present by the alpha test then the fragments at the same position in the underlying layers can be discarded. This method cannot be used for punch through objects which allow for translucency, as it is necessary to process all translucent fragments, in the order that they are submitted, but for OPT objects this method provides more opportunity for discarding fragments without unnecessarily processing them in the fragment processing module 206. That is, processing the front most OPT fragments first allows fragments that are overdrawn by subsequent fragments to be rejected i.e. not sent the fragment processing module 206.

When an OPT fragment is determined to be visible with respect to the PDB 212 a new tag buffer should be allocated into which all fragments for the new OPT object are written. Each fragment that passes the depth test against the PDB 212 is tested against the SDB 216. If a fragment also passes the depth test against the SDB 216 then the SDB 216 is updated with the depth of the new fragment and the front-most tag buffer ID for the fragment is updated to point to the newly allocated tag buffer.

When it is determined to be necessary to flush tag buffers to the fragment processing module 206, for example when no more tag buffers are available, the per-fragment front-most tag buffer IDs are used to determine which fragments should be sent to the fragment processing module 206 first. Once the front most fragments have been sent any remaining fragments can be submitted if necessary (e.g. to make a tag buffer available) a tag buffer at a time in the order in which the tag buffers were allocated i.e. in primitive submission order. Preferably, the HSR module 204 waits for the depths to be resolved for the front-most tags before submitting any remaining fragments.

In the examples described above, the PDB 212 and the SDB 214 relate to the same sample positions of the rendering space, e.g. they relate to the same tile within a tile-based system. Some tile-based systems may be capable of having multiple tiles in flight, in which case a respective pair of depth buffers, i.e. a primary depth buffer and a secondary depth buffer, would be used for each of the tiles that can be simultaneously "in flight" within the HSR module 204. That is, for each currently active tile, a primary depth buffer is used to store depth values of resolved fragments and a secondary depth buffer is used to store depth values of unresolved fragments in accordance with the principles of the methods described herein.

Generally, any of the functions, methods, techniques or components described above (e.g. the depth testing logic 210 and/or the fragment processing module 206) can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation, the module, functionality, component, unit or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component, unit or logic (e.g. the depth testing logic 210 and/or the fragment processing module 206) may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, unit or logic (e.g. the depth testing logic 210 and/or the fragment processing module 206) may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component, unit or logic (e.g. the components of the graphics processing system 200) described above, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing system configured to perform any of the methods described herein, or to manufacture a graphics processing system comprising any apparatus described herein. The IC definition dataset may be in the form of computer code, e.g. written in a suitable HDL such as register-transfer level (RTL) code. An example of processing an integrated circuit definition dataset at an integrated circuit manufacturing system so as to configure the system to manufacture a graphics processing system will now be described with respect to FIG. 5.

Figure 5:
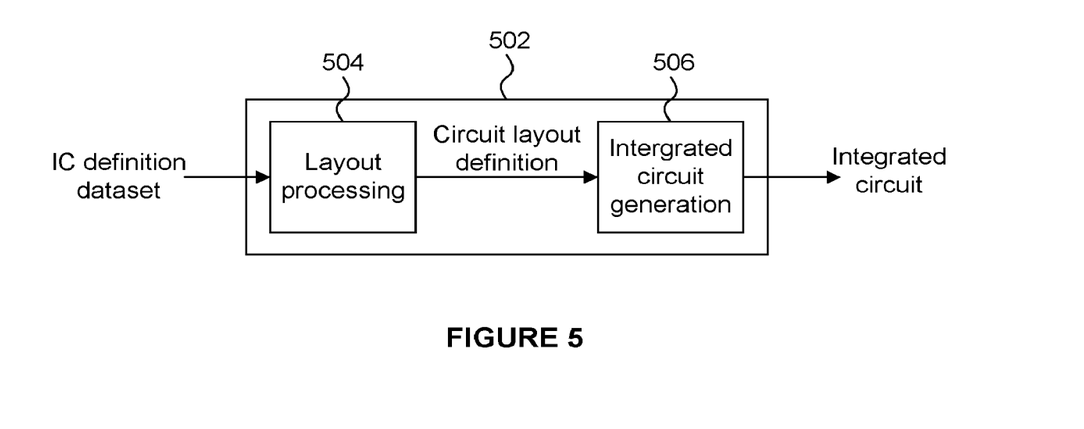
FIG. 5 shows an integrated circuit manufacturing system for generating an integrated circuit embodying a graphics processing system.

FIG. 5 shows an example of an integrated circuit (IC) manufacturing system 502 which comprises a layout processing system 504 and an integrated circuit generation system 506. The IC manufacturing system 502 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 502 to manufacture an integrated circuit embodying a graphics processing unit as described in any of the examples herein. More specifically, the layout processing system 504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 504 has determined the circuit layout it may output a circuit layout definition to the IC generation system 506. The IC generation system 506 generates an IC according to the circuit layout definition, as is known in the art. For example, the IC generation system 506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 506 may be in the form of computer-readable code which the IC generation system 506 can use to form a suitable mask for use in generating an IC. The different processes performed by the IC manufacturing system 502 may be implemented all in one location, e.g. by one party. Alternatively, the IC manufacturing system 502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some examples, an integrated circuit definition dataset could include software which runs on hardware defined by the dataset or in combination with hardware defined by the dataset. In the example shown in FIG. 5, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

What is claimed is:

1. A deferred rendering system for processing fragments of primitives of a scene to be rendered, the deferred rendering system comprising:
   a first depth buffer; and
   a second depth buffer;
   wherein the deferred rendering system is configured to, in response to determining that a depth value of a fragment is to be stored, determine whether to store the depth value of the fragment in the first depth buffer or in the second depth buffer based on whether the fragment is resolved or unresolved, such that:
      if the fragment is resolved, the depth value of the fragment is stored in the first depth buffer; and
      if the fragment is unresolved, the depth value of the fragment is stored in the second depth buffer; and
   wherein the deferred rendering system is configured to render the scene in accordance with values stored in said first and second depth buffers.

2. The deferred rendering system of claim 1,
   wherein a fragment is unresolved if one or more of: (i) the depth of the fragment is not resolved, (ii) the presence of the fragment is not resolved, or (iii) the visibility of the fragment is not resolved; and
   wherein a fragment is resolved if the depth, presence and visibility of the fragment are resolved.

3. The deferred rendering system of claim 1 wherein fragments associated with a punch through object type are unresolved fragments before the presence of the fragments is resolved.

4. The deferred rendering system of claim 1 wherein fragments associated with an opaque object type or a translucent object type are resolved fragments unless the visibility of the fragment is not resolved.

5. The deferred rendering system of claim 1 further comprising depth testing logic configured to perform depth tests for fragments using depth values from at least one of the depth buffers.

6. The deferred rendering system of claim 5 wherein the deferred rendering system comprises:
   a hidden surface removal module which includes said first depth buffer, said second depth buffer and said depth testing logic; and
   a fragment processing module configured to perform one or both of shading and texturing on fragments which can resolve unresolved fragments, wherein the fragment processing module is arranged to act on fragments after the depth testing logic.

7. The deferred rendering system of claim 6 wherein the hidden surface removal module is configured to:
   store, in the first depth buffer, the depth value of a fragment which passes a depth test if the fragment is a resolved fragment;
   store, in the second depth buffer, the depth value of a fragment which passes a depth test if the fragment is an unresolved fragment;
   send unresolved fragments, for which depth values are stored in the second depth buffer, to the fragment processing module to be resolved; and
   update the depth values in the first depth buffer using depth values of resolved fragments fed back from the fragment processing module.

8. The deferred rendering system of claim 5 wherein the depth testing logic is configured to maintain a set of indicators which indicate, for each of a plurality of sample positions, which of the depth buffers to use for the depth tests.

9. The deferred rendering system of claim 8 wherein the graphics processing system is configured to initialise the indicators to indicate the first depth buffer,
   wherein the depth testing logic is configured to set the indicator for a sample position to indicate the second depth buffer if an unresolved fragment at the sample position passes a depth test, and
   wherein the depth testing logic is configured to set the indicator for a sample position to indicate the first depth buffer if a resolved fragment at the sample position passes a depth test performed using a depth value stored in the second depth buffer.

10. The deferred rendering system of claim 5 further configured to resolve the fragments of the second depth buffer if a particular fragment fails a depth test performed using a depth value stored in the second depth buffer, wherein the depth testing logic is configured to:
   use the depth values of the resolved fragments to update the depth values in the first depth buffer; and
   perform a second depth test on the particular fragment using the appropriate depth value stored in the first depth buffer after the updating of the depth values in the first depth buffer.

11. The deferred rendering system of claim 5 further configured such that, if a particular fragment fails a depth test performed using a depth value stored in the second depth buffer, the depth testing logic is configured to:
   perform a second depth test on the particular fragment using the appropriate depth value stored in the first depth buffer;
   wherein the deferred rendering system is configured to, if the particular fragment passes the second depth test: (i) resolve the fragments of the second depth buffer, (ii) use the depth values of the resolved fragments to update the depth values in the first depth buffer, and (iii) perform a third depth test on the particular fragment using the appropriate depth value stored in the first depth buffer after the updating of the depth values in the first depth buffer; and wherein the deferred rendering system is configured to discard the particular fragment if the particular fragment fails the second depth test.

12. The deferred rendering system of claim 11 wherein while the fragments of the second depth buffer are being resolved, the depth testing logic is configured to:

clear the depth values from the second depth buffer; and continue depth testing for fragments of primitives relating to received primitive data, wherein if a resolved fragment passes a depth test its depth value is written into the second depth buffer;

wherein when the fragments of the second depth buffer have been resolved, the depth testing logic is configured to compare the depth values of the resolved fragments with those in the second depth buffer and to update the first depth buffer with resolved depth values accordingly.

13. The deferred rendering system of claim 1 further comprising a set of at least three tag buffers, including:

a first one of the tag buffers which is configured to store primitive identifiers for the fragments whose depth values are stored in the first depth buffer;

a second one of the tag buffers which is configured to store primitive identifiers for the fragments whose depth values are stored in the second depth buffer; and a third one of the tag buffers which is configured to store primitive identifiers for fragments which are in the process of being flushed.

14. The deferred rendering system of claim 1 wherein multiple tag buffers are configured to store primitive identifiers for multiple layers of opaque punch through fragments, wherein the deferred rendering system is configured to control the order in which the multiple tag buffers are flushed such that the front-most opaque punch through fragments are flushed before underlying layers of the opaque punch through fragments.

15. The deferred rendering system of claim 1 wherein the deferred rendering system is a tile-based rendering system in which the rendering space comprises one or more tiles, and wherein each of the depth buffers is configured to store depth values for sample positions within one tile at a time.

16. The deferred rendering system of claim 1 configured to determine that the depth value of the fragment is to be stored by determining that the fragment passes a depth test.

17. A method of processing fragments of primitives of a scene to be rendered in a deferred rendering system which comprises a first depth buffer and a second depth buffer, the method comprising:

in response to determining that a depth value of a fragment is to be stored, determining whether to store the depth value of the fragment in the first depth buffer or in the second depth buffer based on whether the fragment is resolved or unresolved;

if the fragment is resolved, storing the depth value of the fragment in the first depth buffer;

if the fragment is unresolved, storing the depth value of the fragment in the second depth buffer; and using the depth values stored in the first and second depth buffer for rendering the scene.

18. The method of claim 17 wherein depth tests are performed on fragments using depth values stored in at least one of the depth buffers.

19. A method of manufacturing, using an integrated circuit manufacturing system, a deferred rendering system for processing fragments of primitives of a scene to be rendered, the deferred rendering system comprising:

a first depth buffer; and a second depth buffer;

the deferred rendering system being configured to, in response to determining that a depth value of a fragment is to be stored, determine whether to store the depth value of the fragment in the first depth buffer or in the second depth buffer based on whether the fragment is resolved or unresolved, such that:

if the fragment is resolved, the depth value of the fragment is stored in the first depth buffer; and if the fragment is unresolved, the depth value of the fragment is stored in the second depth buffer;

the deferred rendering system being configured to render the scene in accordance with values stored in said first and second depth buffers.

* * * * *